(12) United States Patent
Lo

(10) Patent No.: US 9,756,160 B2
(45) Date of Patent: Sep. 5, 2017

(54) PROTECTIVE SLEEVE

(71) Applicant: Kai Chai Lo, Shau Kei Wan (HK)

(72) Inventor: Kai Chai Lo, Shau Kei Wan (HK)

(*) Notice: Subject to any disclaimer, the term of this patent is extended or adjusted under 35 U.S.C. 154(b) by 0 days.

(21) Appl. No.: 14/720,500

(22) Filed: May 22, 2015

(65) Prior Publication Data
US 2016/0065706 A1    Mar. 3, 2016

(30) Foreign Application Priority Data

Aug. 28, 2014   (HK) .......................... REG 14108789.2

(51) Int. Cl.
*H04B 1/3888*    (2015.01)
*H04M 1/22*    (2006.01)
*H04M 1/02*    (2006.01)
*H04M 1/18*    (2006.01)

(52) U.S. Cl.
CPC ............ *H04M 1/22* (2013.01); *H04B 1/3888* (2013.01); *H04M 1/185* (2013.01)

(58) Field of Classification Search
CPC ...... H04M 1/22; H04M 1/0283; H04B 1/3888
See application file for complete search history.

(56) References Cited

U.S. PATENT DOCUMENTS

| | | | | |
|---|---|---|---|---|
| 8,526,998 B2* | 9/2013 | Koide | ................ | A61B 5/02438 455/550.1 |
| 2004/0137954 A1* | 7/2004 | Engstrom | ............... | G06F 3/016 455/566 |
| 2005/0264241 A1* | 12/2005 | Lee | ......................... | G06F 1/181 315/307 |
| 2008/0108387 A1* | 5/2008 | Entner | ................. | H04B 1/3888 455/557 |
| 2008/0310850 A1* | 12/2008 | Pederson | ........... | G07C 9/00158 398/135 |
| 2012/0302294 A1* | 11/2012 | Hammond | .............. | H04M 1/18 455/567 |
| 2015/0349556 A1* | 12/2015 | Mercando | ........... | H04M 1/7253 455/573 |

* cited by examiner

*Primary Examiner* — Andrew Wendell

(57) ABSTRACT

The present application discloses a protective sleeve, which used for mobile terminals (2), includes a shell (1) and a luminous component (10) provided on the shell (1). The protective sleeve also includes a microphone (3), which is provided on the shell (1) with being used to receive an audio signal and convert it into a pulse signal, and a voice-activated lamp circuit (4), which is provided on the shell (1) with being electronically connected with the microphone (3) and the luminous component (10), respectively and being used to receive the pulse signal and generate a trigger signal corresponding to the pulse signal to turn on and off the luminous component (10). The protective sleeve in the present application is simple and practical, and has some entertainment.

7 Claims, 5 Drawing Sheets

PROTECTIVE SLEEVE

TECHNICAL FIELD

The present application relates to the field of mobile terminals, and more particularly to a protective sleeve for mobile terminals.

BACKGROUND

Mobile terminals (such as smart mobile phones, tablet personal computers, etc.) in the prior art have the function for playing an audio. The audio includes ring-tunes of phone, voices or music in a video, etc. However, protective sleeves of mobile terminals have been provided without light device to twinkle as an audio is playing. Thus, the effect generated when the audio is being played is boring, which fail to satisfy various hedonic demands of people.

SUMMARY

As protective sleeves of mobile terminals provided without light device to twinkle as an audio is playing cause boring effects generated in prior art, the object of the present application is to provide a protective sleeve and a mobile terminal with the protective sleeve.

The technical solution of the application is as follows:

A protective sleeve is provided, which is used for mobile terminals, the protective sleeve includes a shell and a luminous component provided on the shell. The protective sleeve also includes a microphone, which is provided on the shell with being used to receive an audio signal and convert it into a pulse signal, and a voice-activated lamp circuit, which is provided on the shell with being electronically connected with the microphone and the luminous component, respectively and being used to receive the pulse signal and generate a trigger signal corresponding to the pulse signal to turn on and off the luminous component.

On the above protective sleeve, the voice-activated lamp circuit includes a pulse distributor integrated circuit, whose type is FR2067S. The pulse distributor integrated circuit includes OP pin, VDD pin, ON/OFF pin, EL/LED pin and GND pin. The input port of the microphone is connected to reference ground, the output port of the microphone is electrically connected to the VDD pin of the pulse distributor integrated circuit via the first protective resistor, the VDD pin of the pulse distributor integrated circuit is also electrically connected to the positive electrode of solar cells via a third protective resistor.

The OP pin of the pulse distributor integrated circuit is electrically connected to the output port of the microphone via a first filter capacitor, the OP pin of the pulse distributor integrated circuit is also electrically connected to the GND pin of the pulse distributor integrated circuit via the second protective resistor.

The luminous component includes a positive electrode and a negative electrode. The EL/LED pin of the pulse distributor integrated circuit is electrically connected to the negative electrode of the luminous component. The positive electrode of the luminous component is electrically connected to positive electrode of the solar cells. The negative electrode of the solar cells is electrically connected to the GND pin of the pulse distributor integrated circuit.

On the above protective sleeve, the ON/OFF pin of the pulse distributor integrated circuit is electrically connected to the GND pin of the pulse distributor integrated circuit via a switch.

On the above protective sleeve, a second holding groove is provided on the shell, the switch is provided at the bottom of the second holding groove. The protective sleeve also includes a first groove cover fixed on the shell removably and used to cover the second holding groove.

On the above protective sleeve, the pulse distributor integrated circuit and the solar cells are both provided in the second holding groove.

On the above protective sleeve, the voice-activated lamp circuit also includes a second filter capacitor electrically connected between the VDD pin of the pulse distributor integrated circuit and the negative electrode of the solar cells.

On the above protective sleeve, a first holding groove used to hold a mobile terminal. The luminous component is an electroluminescent light provided along the opening of the first holding groove.

On the above protective sleeve, a hole is provided on the back surface of the shell corresponding to the position of a camera of the mobile terminal.

In the present application, a microphone is provided on the shell, which is to receive an audio signal and to convert it into a pulse signal. Then a voice-activated lamp circuit is provided on the shell, which is to receive the pulse signal and to generate a trigger signal corresponding to the pulse signal, which is to turn on and off a luminous component provided on the protective sleeve. Thus it can be achieved that the luminous component emits twinkling lights as audio is being played. Moreover, a switch is provided to control the twinkling function of the luminous component. A pulse distributor integrated circuit is provided to simply the voice-activated lamp circuit. Also, a second holding groove is provided to make the protective sleeve briefer. The protective sleeve in the present application is simple and practical, and has some entertainment.

BRIEF DESCRIPTION OF THE DRAWINGS

The present application will be further described with reference to the accompanying drawings and embodiments in the following, in the accompanying drawings.

DETAILED DESCRIPTION OF THE PREFERRED EMBODIMENT

The present application is to be further described with reference to the accompanying drawings and embodiments.

The idea of the present application is: a microphone is provided on the shell, which is to receive an audio signal and to convert it into a pulse signal. Then a voice-activated lamp circuit is provided on the shell, which is to receive the pulse signal and to generate a trigger signal corresponding to the pulse signal, which is to turn on and off a luminous component provided on the protective sleeve. Thus it can be achieved that the luminous component emits twinkling lights as audio is being played.

Figure 1:
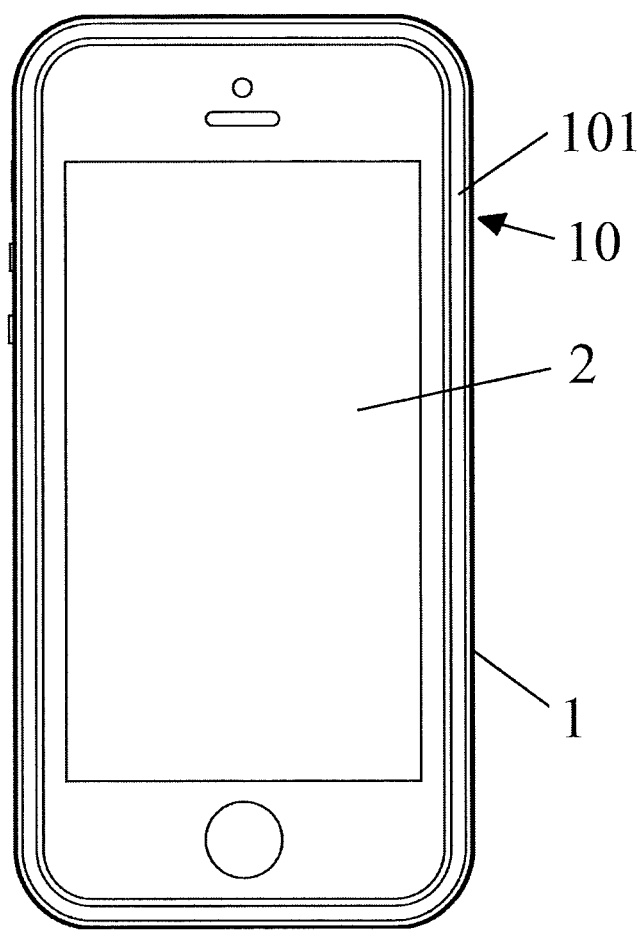
FIG. 1 illustrates a positive schematic of a protective sleeve in accordance with an embodiment of the present application.
Figure 2:
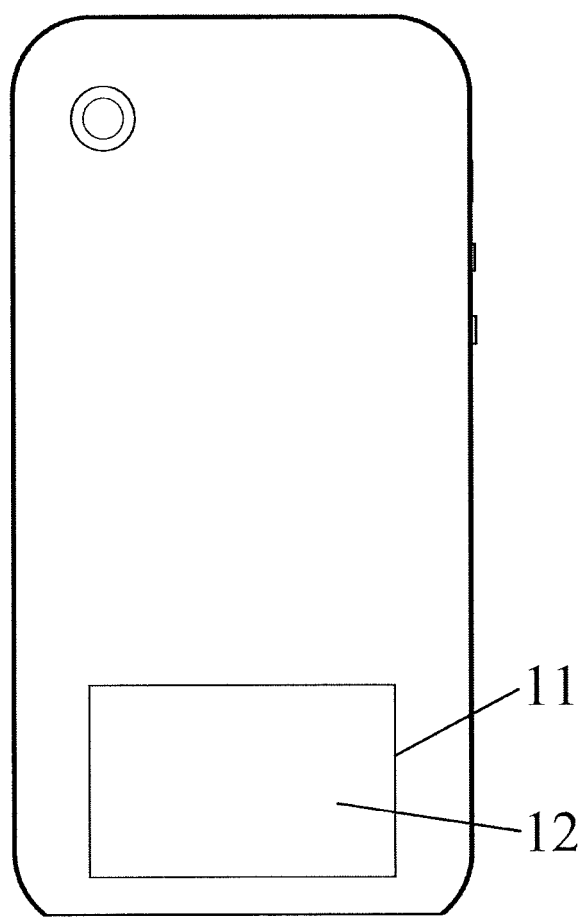
FIG. 2 illustrates a rear view of the protective sleeve in FIG. 1.

Specifically, refer to FIG. 1 and FIG. 2, which illustrate a schematic of a protective sleeve in accordance with an embodiment of the present application. In this embodiment, the protective sleeve comprises a shell 1. A first holding groove is generated on the shell, which is used to hold a mobile terminal 2. The screen of the mobile terminal 2 can be seen through the opening of the first holding groove, when the mobile terminal 2 is loaded in the protective sleeve. In the present application, the surface of the shell 1 having the opening of the first holding groove is marked as the positive surface of the shell 1, and the surface of the shell 1 reverse to the opening of the first holding groove is marked as the back surface of the shell 1. Here the mobile terminal 2 can be a tablet personal computer (such as IPAD), a MP3/MP4 player (such as IPOD), a portable gaming device (such as PSP), a personal digital assistant (PDA), or other electronics. The shell is made of rigid plastic, soft plastic, silica gel, thermoplastic polyurethanes (TPU), ABS metal, or other plastics.

The protective sleeve includes a luminous component 10, which is provided on the shell 1. In this embodiment, as shown in FIG. 1, the luminous component 10 is an electroluminescent light 101. As shown in the FIG. 1, the electroluminescent light 101 is provided along the opening of the first holding groove. Of course, the electroluminescent light 101 is not just provided along the opening of the first holding groove, but also provided on the opposite surface, side-surface or edge of the shell 1. In addition, the shape of the electroluminescent light 101 can be designed as other patterns, it can be a dragon, or phoenix, or other complicate patterns, for example.

What can be understood, the luminous component 10 is not limited to the electroluminescent light 101. It also can be a luminous diode. Due to small volume and strong emitting light of the luminous diode, the luminous component 10 is provided on the shell 1 without affecting the visual effect of overall appearance of the protective sleeve. What can be understood, the number of luminous diodes may depend on design requirements. Further, according to the design requirements, luminous diodes are provided on the positive surface, back surface, or side-surface of the shell 1. In addition, a plurality of luminous diodes can be arranged in a variety of patterns, for example, a plurality of luminous diodes can be arranged in the constellation, or cartoon design, etc.

Figure 3:
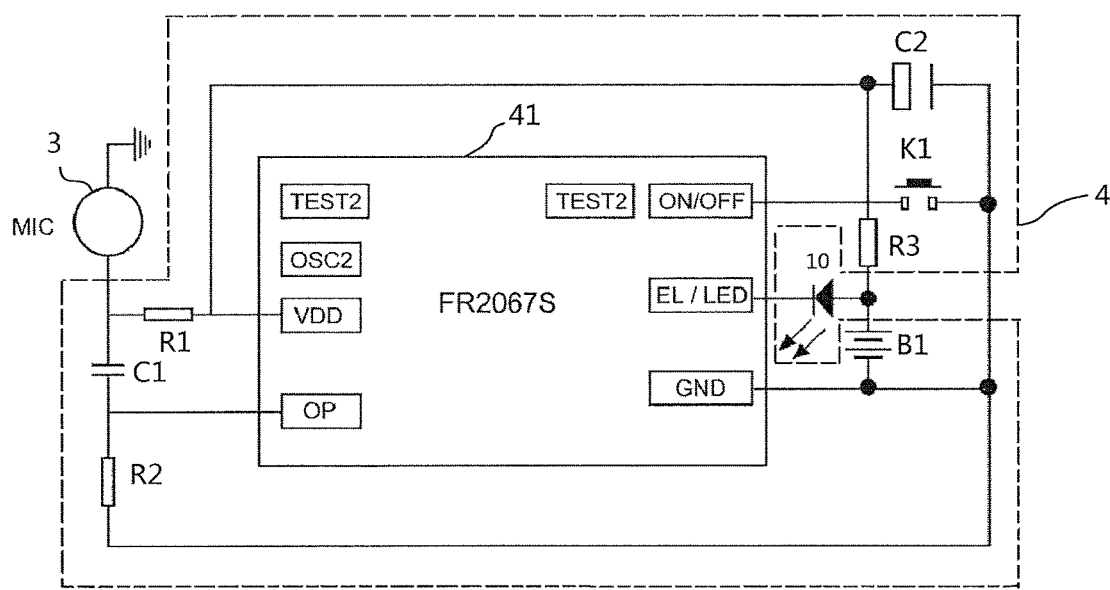
FIG. 3 illustrates a circuit diagram of voice-activated lamp circuit of the protective sleeve in FIG. 1.

Further, in this embodiment, referring to FIG. 3, the protective sleeve includes a microphone 3 and a voice-activated lamp circuit 4. The microphone 3 is provided on the shell 1 with being used to receive an audio signal and convert it into a pulse signal. The voice-activated lamp circuit 4 is provided on the shell 1 with being electronically connected with the microphone 3 and the luminous component 10, respectively. It is used to receive the pulse signal and generate a trigger signal corresponding to the pulse signal, which is to turn on and off the luminous component 10.

Preferably, in this embodiment, the microphone 3 can not only receive audio signals sent by the mobile terminal 2, but also receive audio signals of the outer environment. In some designs, in order to reduce an occurrence that the luminous component 10 emits twinkling lights with the audio signals of the outer environment, the microphone 3 is provided on the position of the shell 1, where is corresponding to the position of a speaker of the mobile terminal 2. In this embodiment, the microphone 3 is provided on the bottom of the first holding groove, where is corresponding to the position of the speaker of the mobile terminal 2.

In this embodiment, referring to FIG. 3, the voice-activated lamp circuit 4 includes a pulse distributor integrated circuit 41, whose type is FR2067S. The pulse distributor integrated circuit 41 includes OP pin, VDD pin, ON/OFF pin, EL/LED pin and GND pin. The output port of the microphone 3 is electrically connected to the VDD pin of the pulse distributor integrated circuit 41 via the first protective resistor R1. Also, the VDD pin of the pulse distributor integrated circuit 41 is electrically connected to the positive electrode of solar cells B1 via a third protective resistor R3.

Further, the OP pin of the pulse distributor integrated circuit 41 is electrically connected to the output port of the microphone 3 via a first filter capacitor C1. The OP pin of the pulse distributor integrated circuit 41 is also electrically connected to the GND pin of the pulse distributor integrated circuit 41 via the second protective resistor R2. The OP pin is used to receive the pulse signal sent by the microphone 3. The pulse distributor integrated circuit 41 magnifies the pulse signal.

The luminous component 10 includes a positive electrode and a negative electrode. The EL/LED pin of the pulse distributor integrated circuit 41 is electrically connected to the negative electrode of the luminous component 10. The positive electrode of the luminous component 10 is electrically connected to positive electrode of the solar cells B1. The negative electrode of the solar cells B1 is electrically connected to the GND pin of the pulse distributor integrated circuit 41.

Here after the OP pin of the pulse distributor integrated circuit 41 has received the pulse signal sent by the microphone 3, the EL/LED pin of the pulse distributor integrated circuit 41 is to generate the trigger signal, which is corresponding to the pulse signal. And the trigger signal can turn on or off the luminous component 10. Thus, the luminous component 10 is to emit twinkling lights.

Preferably, in this embodiment, the voice-activated lamp circuit 4 also includes a second filter capacitor C2, which is electrically connected between the VDD pin of the pulse distributor integrated circuit 41 and the negative electrode of the solar cells B1.

To allow users to adjust the luminous component 10 more autonomously, for example, sometimes users don't want to the luminous component 10 to twinkle with the audio being played. Then there is a need to turn off the luminous component 10. In this embodiment, the ON/OFF pin of the pulse distributor integrated circuit 41 is electrically connected to the GND pin of the pulse distributor integrated circuit 41 via a switch K1. Thus, with the switch K1, users can control the function that the luminous component 10 twinkles with audio being played.

Figure 4:
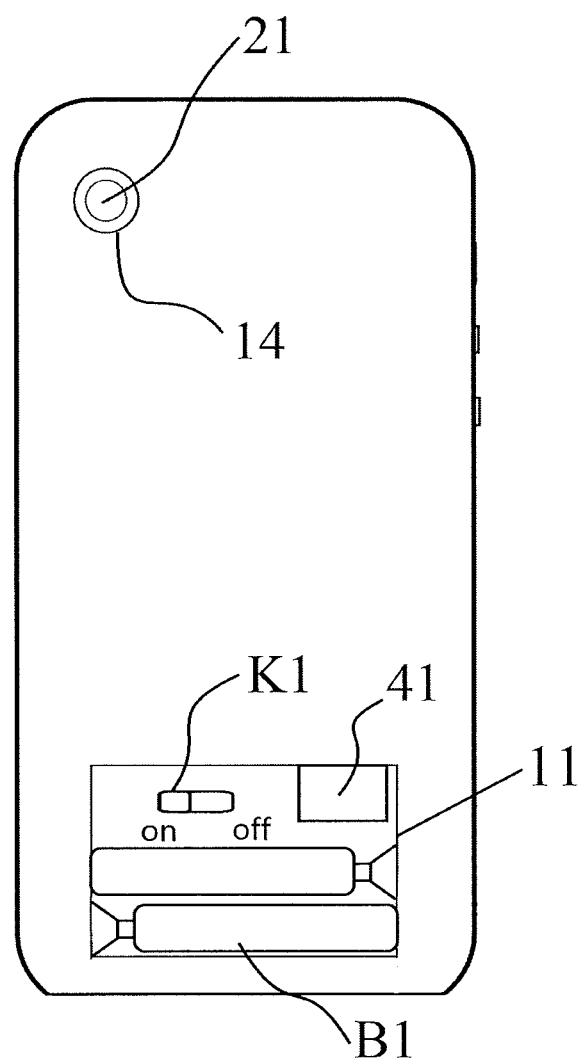
FIG. 4 illustrates a reference diagram for use state of the protective sleeve in FIG. 1.

Further, referring to FIG. 2 and FIG. 4, a second holding groove 11 is provided on the shell 1. Preferably, the second holding groove 11 is set on the back surface of the shell 1. The switch K1 is provided at the bottom of the second holding groove 11. What can be understood, the second holding groove 11 is also provided on the side-surface of the shell 1. The switch K1 can be a slide switch, as shown in FIG. 4, also can be a push button switch, etc. To prevent a misoperation of the switch K1, the protective sleeve also includes a first groove cover 12, which is fixed on the shell 1 removably and used to cover the second holding groove 11. What can be understood, the switch K1 can also be provided on the side-surface of the shell 1.

Figure 5:
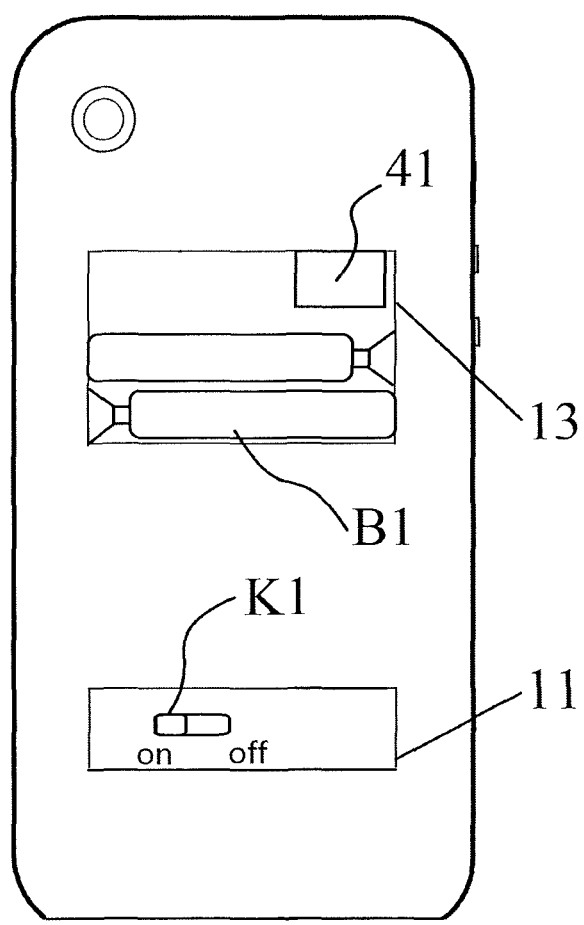
FIG. 5 illustrates a reference diagram for use state of a protective sleeve in accordance with another embodiment of the present application.

Further, in this embodiment, the pulse distributor integrated circuit 41 and the solar cells B1 are both provided in the second holding groove 11, as shown in FIG. 4. Therefore, only the first holding groove and the second holding groove 11 is provided on the protective sleeve, which makes the overall appearance of the protective sleeve simple. However, when the first holding groove opens, components arrangement in the second holding groove 11 makes users feel messy. In order to avoid this, in other embodiments, a third holding groove 13 is provided on the back surface of the shell 1. The third holding groove 13 is used to hold the solar cells B1 and the pulse distributor integrated circuit 41. The protective sleeve also includes a second groove cover (not shown in FIGS.), which is fixed on the shell 1 removably and used to cover the third holding groove 13, as shown in FIG. 5.

In addition, a hole 14 is provided on the back surface of the shell 1, which is corresponding to the position of a camera 21 of the mobile terminal 2.

In addition, the solar cells B1 is a rechargeable battery, such as lithium battery, lithium polymer battery, lithium ion battery, etc. the charge interface of the rechargeable battery is provided on the side-surface or back surface of the shell 1. What can be understood, in this embodiment, the protective sleeve also includes a adjustment apparatus, which is electrically connected to the microphone 3 and used to control the sensitivity that the microphone 3 receives voice. In addition, in this embodiment, the luminous component 10 includes multiple light emitting sub-units with different colors and being in parallel. The protective sleeve also includes a color switch apparatus, which is used to switch conducting states of multiple light emitting sub-units to change the color of light emitted by the luminous component 10. Further, the protective sleeve also includes a bracket provided on the back surface of the shell 1. The mobile terminal 2 in the protective sleeve can stand with the bracket. In general, the angle between the plane of the mobile terminal 2 and the vertical plane is 30°-45°. Thus, it is convenient for users to watch musical MVs, movies, or other videos.

In the present application, a microphone is provided on the shell, which is to receive an audio signal and to convert it into a pulse signal. Then a voice-activated lamp circuit is provided on the shell, which is to receive the pulse signal and to generate a trigger signal corresponding to the pulse signal, which is to turn on and off a luminous component provided on the protective sleeve. Thus it can be achieved that the luminous component emits twinkling lights as audio is being played. Moreover, a switch is provided to control the twinkling function of the luminous component. A pulse distributor integrated circuit is provided to simply the voice-activated lamp circuit. Also, a second holding groove is provided to make the protective sleeve briefer. The protective sleeve in the present application is simple and practical, and has some entertainment.

It should be understood that, one skilled in the art can make any improvements or modifications, and these improvements and modifications should be included within the scope of the present application.

The invention claimed is:

1. A protective sleeve, used for mobile terminals (2), wherein the protective sleeve includes a shell (1) and a luminous component (10) provided on the shell (1), the protective sleeve also includes a microphone (3), which is provided on the shell (1) with being used to receive an audio signal and convert it into a pulse signal, and a voice-activated lamp circuit (4), which is provided on the shell (1) with being electronically connected with the microphone (3) and the luminous component (10), respectively and being used to receive the pulse signal and generate a trigger signal corresponding to the pulse signal to turn on and off the luminous component (10);

wherein the voice-activated lamp circuit (4) includes a pulse distributor integrated circuit (41), whose type is FR2067S; the pulse distributor integrated circuit (41) includes Operating Point pin ("OP pin"), Voltage Drain Drain pin ("VDD pin"), ON/OFF pin, Electroluminesce/Light Emitting Diode pin ("EL/LED pin"), and Ground pin ("GND pin"), the output port of the microphone (3) is electrically connected to the VDD pin of the pulse distributor integrated circuit (41) via a first protective resistor (R1); the VDD pin of the pulse distributor integrated circuit (41) is also electrically connected to a positive electrode of solar cells (B1) via a third protective resistor (R3);

the OP pin of the pulse distributor integrated circuit (41) is electrically connected to the output port of the microphone (3) via a first filter capacitor (C1); the OP pin of the pulse distributor integrated circuit (41) is also electrically connected to the GND pin of the pulse distributor integrated circuit (41) via a second protective resistor (R2);

the luminous component (10) includes a positive electrode and a negative electrode;

the EL/LED pin of the pulse distributor integrated circuit (41) is electrically connected to the negative electrode of the luminous component (10); the positive electrode of the luminous component (10) is electrically connected to the positive electrode of the solar cells (B1); a negative electrode of the solar cells (B1) is electrically connected to the GND pin of the pulse distributor integrated circuit (41).

2. The protective sleeve according to claim 1, wherein the ON/OFF pin of the pulse distributor integrated circuit (41) is electrically connected to the GND pin of the pulse distributor integrated circuit (41) via a switch (K1).

3. The protective sleeve according to claim 2, wherein a second holding groove (11) is provided on the shell (1), the switch (K1) is provided at the bottom of the second holding groove (11); the protective sleeve also includes a first groove cover (12) fixed on the shell (1) removably and used to cover the second holding groove (11).

4. The protective sleeve according to claim 3, wherein the pulse distributor integrated circuit (41) and the solar cells (B1) are both provided in the second holding groove (11).

5. The protective sleeve according to claim 1, wherein the voice-activated lamp circuit (4) also includes a second filter capacitor (C2) electrically connected between the VDD pin of the pulse distributor integrated circuit (41) and the negative electrode of the solar cells (B1).

6. The protective sleeve according to claim 1, wherein a first holding groove is used to hold a mobile terminal (2); the luminous component (10) is an electroluminescent light (101) provided along the opening of the first holding groove.

7. The protective sleeve according to claim 1, wherein a hole (14) is provided on the back surface of the shell (1) corresponding to the position of a camera (21) of the mobile terminal (2).

* * * * *